United States Patent [19]
Wallisch

[11] Patent Number: 5,406,035
[45] Date of Patent: Apr. 11, 1995

[54] PRICE-INDICATING ELECTRONIC APPARATUS

[75] Inventor: Gebhard Wallisch, Burladingen, Germany

[73] Assignee: Mettler-Toledo (Albstadt)GmbH, Albstadt, Germany

[21] Appl. No.: 982,713

[22] Filed: Nov. 27, 1992

[30] Foreign Application Priority Data

Nov. 29, 1991 [DE] Germany .......... 41 39 493.3

[51] Int. Cl.6 .......... G01G 19/40; G06F 15/22; G07G 1/12
[52] U.S. Cl. .......... 177/25.15; 364/401; 364/405
[58] Field of Search .......... 177/25.15; 364/401, 364/405

[56] References Cited

U.S. PATENT DOCUMENTS 4,213,179  7/1980  Hamano et al. .......... 364/405
4,651,279  3/1987  Suzuki .......... 364/405

FOREIGN PATENT DOCUMENTS 0235335  9/1987  European Pat. Off. ..
0152055  5/1989  European Pat. Off. ..
3490136  5/1985  Germany .
3518119  11/1986  Germany .
2088599  6/1982  United Kingdom .

OTHER PUBLICATIONS

Patent Abstracts of Japan, vol. 6, No. 212, 1982.
Patent Abstracts of Japan, vol. 12, No. 415, 1988.

*Primary Examiner*—George H. Miller, Jr.
*Attorney, Agent, or Firm*—Jacobson, Price, Holman & Stern

[57] ABSTRACT

In a price-calculating electronic shop scale having numeric display fields (9, 10, 11) for displaying the found-out weight of an article and the basic selling and purchase prices, respectively, of the article per unit of weight, an additional optical display unit (12, 13, 14) is provided which displays information evaluating the profit gained by the respective sales transaction. In this way the sales personnel is provided with a constant overview of the profit made by its sales activities without profit figures being revealed.

7 Claims, 1 Drawing Sheet

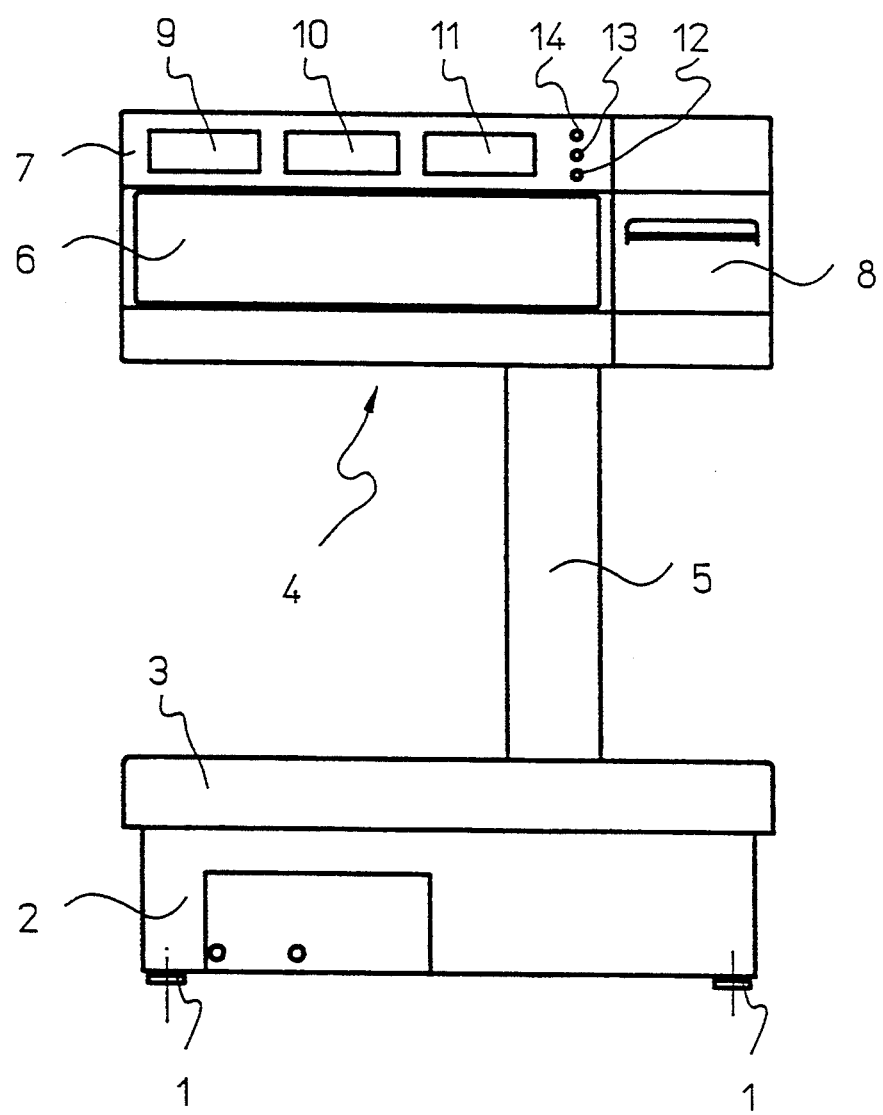

PRICE-INDICATING ELECTRONIC APPARATUS

BACKGROUND OF THE INVENTION

This invention relates to a price-indicating electronic apparatus for selling individual articles from a number of different goods, comprising a storage device for storing data, the selling price for each individual article being determined depending on the information content of said data, an input keyboard for inputting information identifying each article to be sold, a visual display device having a numeric display unit displaying the associated selling price, and a processing device connected to said storage device, said keyboard and said visual display device, said processing device determining the selling price of the respective article depending on the identification information inputted by means of said keyboard and actuating said display unit for display of the selling price.

Conventional appliances of this type, e.g. cash registers or price-calculating scales, thus enable an automatic determination of the selling price of an article to be sold on the basis of the identification information having been inputted by means of the keyboard, and indicate said price on the visual display device. In this way, the information required for a sales transaction, viz. the selling price, is automatically determined and displayed. The information identifying the article may in particular consist in the article numbers generally used in the trade and also referred to as PLU (Price-Look-Up) numbers in commercial language.

In commerce, however, there is foreseeable a future development to the effect that an expansion to the present extent will no longer be possible so that there is a trend to make the present markets more profitable. Therefore it would be desirable to provide the sales personnel during each sales transaction with profit-related information so as to motivate it to promote the sales of profitable goods as far as it may influence such promotion. This is, however, not possible with conventional electronic apparatuses which merely determine the selling price and perhaps the weight and selling-date.

SUMMARY OF THE INVENTION

The object of this invention is to improve an electronic apparatus of the type mentioned initially above such that it provides the sales personnel in the case of each sales transaction also with information evaluating the sale in regard of profit.

According to the invention, this object is achieved in that for each article said storage device has stored in it data the information content of which is used to generate in each case by means of said processing device a signal evaluating the benefit derived from selling the respective article, and that said visual display device has a second display unit actuated by said electronic processing device for visual display of said evaluation signal.

In the inventive apparatus thus the evaluation signal is represented on the additional display unit after input of the identification information, for example of the article number, by means of the keyboard. The sales personnel therefore can see in the case of each sales transaction whether the latter one is profitable for the company. During the sales transactions that are carried through during one day (normally several hundreds), the sales assistant thus is enabled by the visual representation of the evaluation signal to form an estimate whether the sales activities performed are profitable. Since the evaluation signal merely indicates whether the sales transaction is more or less profitable, no figures on the margin between the selling price and the purchase price need be disclosed.

The invention may be implemented in a particularly advantageous manner in an apparatus of this type which includes a weighing cell for generating an electric output signal representing the weight of the article to be sold, said weighing cell being connected to said processing device and wherein the information content of the data stored in said storage device comprises the basic selling price per unit of weight for each individual article, and said processing device establishes depending on the output signal from said weighing cell and the identifying information inputted by means of said keyboard a weight value and the selling price which corresponds to said weight value, as well as actuating said numeric display unit for display of the weight value and the selling price, if said processing device generates said evaluation signal depending on the basic selling prices.

Given that apparatuses of this type which serve as price-calculating electronic shop scales in any case are provided with the storage device for storing the basic selling prices, the improvement provided by the invention may easily be implemented in conventional electronic shop scales wherein merely the visual display device is supplemented by an additional display unit and otherwise the operation of the processing device and the contents of the storage device need be adapted such that the evaluation signal can be generated. The shop scale as improved by the invention thus is distinguished by a simple structure.

In a preferred embodiment of the shop scale as improved by the invention, the basic purchase prices for the individual articles are stored as additional data in said storage device, said processing device has means for establishing the difference between the basic selling price and the basic purchase price as well as a comparator for comparing the difference with at least one predetermined threshold value, and the evaluation signal is formed by the output signal from said comparator, said output signal representing the result of comparison.

The difference between the basic selling price and the basic purchase price as obtained in this embodiment thus represents the so-called contribution margin. The contribution margin is classified by height through the threshold value comparison, effecting thus the desired evaluation. If, for example, two threshold values are provided, any contribution margins below the first threshold value may be classified as non-profitable any one between the first and the second threshold values may be classified as moderately profitable, and anyone above the second threshold value may be classified as highly profitable.

In an advantageous refinement of this embodiment, said second display unit has a number of optical indicators corresponding to the number of intervals defined by the threshold values, of which the indicator corresponding to the interval having been selected on the basis of the result of comparison is actuated in each case for display. In this case, separate optical indicators on the visual display device respectively correspond to the interval below the lowest threshold value, the intervals between the threshold values and the interval above the highest threshold value, whereby a very clear representation of the evaluation of the respective sales transaction is obtained.

In particular, it is advantageous in this connection if said indicators are formed by luminous indicators of different light color. As far as two threshold values are provided, a particularly clear representation will be obtained if the light color red corresponding to "non-profitable" indicates the interval below the lowest threshold value, the light color yellow corresponding to "moderately profitable" indicates the next, higher interval, and the light color green corresponding to "highly profitable" indicates the highest interval.

According to another aspect of the invention, a price-indicating electronic apparatus, in particular a price-calculating electronic shop scale, wherein the turnover from selling prices having been made during a predetermined number of sales transactions is summed up and the sum total is stored is developed in that an evaluation signal related to the added-up turnover is generated and that said second display unit can be actuated for display of said sum-related evaluation signal.

For example, in these apparatuses the turnover may be kept as turnover relating to sales assistants, groups of goods, individual articles, etc. It is then possible to calculate from these data the contribution margins within different categories, for example per sales assistant, department, group of goods, article, etc. over a certain period of time. The representation of the sum-related evaluation signal on the display unit thus informs the manager of the market or head of the department at a glance whether during the respective time period, for example one day, one week, one month or else one year, the sales transactions carried out with the aid of the shop scale have been successful in regard of profit.

Additional features, details and advantages of the invention will be apparent, by the example of an electronic shop scale, from the following description wherein reference is made to the drawing.

BRIEF DESCRIPTION OF THE DRAWING

FIG. 1 is a front view of the price-indicating electronic apparatus according to the present invention.

DETAILED DESCRIPTION OF THE DRAWING

According to the single figure of the drawing, an electronic shop scale has a weighing cell disposed in a housing 2 which is provided with supporting feet 1 supporting it on a foundation, on which weighing cell a weighing platform 3 for receiving goods to be weighed is supported. The weighing cell generates, on the basis of the weight of the goods to be weighed which is transmitted from the weighing platform 3 to the weighing cell, an electric output signal corresponding to said weight.

An evaluation device 4 is supported by means of a supporting column 5 having its lower end arranged on the housing 2 at a distance above the weighing platform 3. The evaluation device 4 has an input keyboard 6 illustrated only schematically in the drawing, said keyboard being downwardly forwardly inclined toward the viewer with respect to the plane of the drawing, and a visual display device 7 above the input keyboard 6. Furthermore, an electronic storage device and an electronic processing device are provided in the evaluation device 4, said processing device being connected to each of the storage device, the input keyboard 6, the visual display device 7 and, via a connecting cable extending along the supporting porting column 5 inside the latter, the weighing cell. In the illustrated embodiment furthermore a printer 8 is integrated within the evaluation device 4.

In the storage device is stored the basic selling price per unit of weight, e.g. one kilogram, for the particular goods in professional terminology referred to as "articles" or "PLUs". During the weighing process, information identifying the article, for example an article number or PLU number, is input by means of the input keyboard 6, on the basis of which the electronic processing device, which also receives the electric output signal representing the weight, determines the selling price of the weighed article corresponding to the weight detected by the weighing cell. The visual display device 7 has a numeric display unit of e.g. 7-segment display elements or dot matrix display elements and is subdivided into three multidigit display fields 9, 10, 11, the first display field 9 thereof being actuated by the electronic processing device during the weighing process for display of the detected weight, the second display field 10 thereof being actuated for display of the basic selling price selected in the storage device after input of the PLU number by means of the input keyboard 6, and the third display field 11 thereof being actuated for display of the selling price calculated by the processing device. The data displayed in the display fields 9, 10, 11 can be printed by means of the printer 8 which is actuated by the electronic processing device.

In addition to the respective basic selling prices, also the basic purchase price is stored in the storage device. When, during the weighing process, the identification information corresponding to the article just to be weighed has been input by means of the input keyboard 6, a device located in the processing device determines the difference between the basic selling price and the basic purchase price, i.e. the contribution margin, in order to make an evaluation of the sales transaction in regard of profit. In detail, for this purpose at least one threshold value (in the illustrated embodiment: two threshold values) is preset in a comparator provided in the processing device, and said difference is compared with said value. In this way the output signal from the comparator represents an evaluation signal indicating the profitability of the respective sales transaction.

To display the evaluation signal visually, a second display unit is provided on the visual display device 7, which second display unit in the illustrated embodiment has three luminous indicators 12, 13, 14, for example in the form of light-emitting diodes. As long as the evaluation signal indicates that the difference between the basic selling price and the basic purchase price, i.e. the contribution margin, is smaller than the lower one of the two threshold values preset in the comparator, the processing device actuates the luminous indicator 12, which has a red light color, for display. If, however, the contribution margin is between the two threshold values, the luminous indicator 13, which emits a yellow light color, is actuated. If the contribution margin has reached or exceeds the upper threshold value, the luminous indicator 14, which emits a green light color, is actuated. The additional display unit having the luminous indicators 12, 13 and 14 thus conveys, via its optical signals, information to the sales personnel regarding the profitability of the respective sales transaction by inducing the personnel to interpret the light colors red, yellow and green as "not profitable", "moderately profitable" and "highly profitable", respectively. In this way the sales personnel gets an immediate impression of the efficiency of its sales activities for the company and, accordingly, is motivated as to the way it behaves during sales activities.

The storage device provided in the evaluation device 4 also makes it possible to store turnover added up over a number of sales transactions, which turnover may e.g. be separately registered and stored according to sales assistants, groups of goods, or similar criteria. Also, such registration and storage may cover different periods of time, for example one day, one week, one month or one year. Instead of evaluating the individual sales transactions, the evaluation of the added-up turnover may be effected in the same way by comparing, for example, the added-up contribution margins contained in this added-up turnover with added-up threshold values. The thus sum-related evaluation signals may then be represented, instead of the evaluation signals being related to the individual weighing transactions, by means of the luminous indicators 12, 13, 14 so that leading personnel, for example the head of a department, is provided with an immediate overview of the success achieved by the total sales activities.

I claim:

1. An electronic apparatus for indicating sales of a plurality of different articles, the apparatus comprising:
    a weighing cell for generating an electric output signal representing the weight of an article to be sold,
    data storage means for storing information related to the basic selling price and the basic purchase price per unit of weight for each individual article;
    an input keyboard for inputting identification information which identifies each article to be sold;
    display means comprising a numerical display unit for displaying the weight and the selling price of an article to be sold, said display means further comprising profit evaluation display means suitable for displaying an indication of a measure of profit derived from the sale of an article;
    processing means connected to said storage means, said keyboard means, said display means and, said weighing cell, said processing means generating a weight value and a selling price of the article depending on an output signal from said weighing cell and the identification information and actuating said display means for display of the weight value and the selling price, said processing means further comprising profit evaluation means for establishing the difference between the basic selling price and the basic purchase price and comprising a comparator for comparing the difference with at least one predetermined threshold value, and generating an evaluation signal on the basis of an output signal from said comparator, said profit evaluating means actuating said profit evaluation display means.

2. The apparatus of claim 1, wherein said profit evaluation display means comprises a plurality of optical indicators corresponding to the number of intervals defined by threshold values, an indicator corresponding to a particular interval being selected on the basis of an output of the comparator.

3. The apparatus of claim 2, wherein said processing means determines a turnover from selling prices made during a predetermined number of sales transactions which are summed up and a sum total is stored in the data storage means, the profit evaluating means generating the evaluation signal on the basis of the turnover which is accumulated.

4. The apparatus of claim 2, wherein said indicators comprise luminous indicators of different light color.

5. The apparatus of claim 4, wherein said processing means determines a turnover from selling prices made during a predetermined number of sales transactions which are summed up and a sum total is stored in the data storage means, the profit evaluating means generating the evaluation signal on the basis of the turnover which is accumulated.

6. The apparatus of claim 1, wherein said processing means determines a turnover from selling prices made during a predetermined number of sales transactions which are summed up and a sum total is stored in the data storage means, the profit evaluating means generating the evaluation signal on the basis of the turnover which is accumulated.

7. An electronic apparatus for indicating sales of a plurality of different articles, the apparatus comprising:
    a weighing cell for generating an electric output signal representing the weight of an article to be sold,
    data storage means for storing information related to the basic selling price and the basic purchase price per unit of weight for each individual article,
    an input keyboard for inputting identification information which identifies each article to be sold,
    display means comprising a numerical display unit for displaying the weight and the selling price of an article to be sold, said display unit further comprising profit evaluation display means suitable for displaying an indication of a measure of profit derived from the sale of an article, and
    processing means connected to said storage means, said keyboard means, said display means and said weighing cell, said processing means generating a weight value and a selling price of the article depending on an output signal from said weighing cell and the identification information and actuating said display means for display of the weight value and the selling price, said processing means further establishing the difference between the basic selling price and the basic purchase price and comprising a comparator for comparing the difference with at least one predetermined threshold value, and generating an evaluation signal on the basis of an output signal from said comparator.

* * * * *